United States Patent [19]

Vogel

[11] Patent Number: 5,031,970
[45] Date of Patent: Jul. 16, 1991

[54] DEVICE FOR THE GENERATION OF AUXILIARY PRESSURE FOR SLIP-CONTROLLED BRAKE SYSTEMS

[75] Inventor: Guenther Vogel, Frankfurt am Main, Fed. Rep. of Germany

[73] Assignee: Alfred Teves GmbH, Frankfurt am Main, Fed. Rep. of Germany

[21] Appl. No.: 509,934

[22] Filed: Apr. 16, 1990

[30] Foreign Application Priority Data

Apr. 20, 1989 [DE] Fed. Rep. of Germany ....... 3912938

[51] Int. Cl.⁵ .......................... B60T 8/44; B60T 13/52
[52] U.S. Cl. .................................... 303/114; 303/119; 188/356
[58] Field of Search ............................. 303/114, 119; 188/355-359; 60/545, 547.1

[56] References Cited

U.S. PATENT DOCUMENTS

| | | | |
|---|---|---|---|
| 4,630,706 | 12/1986 | Takayama et al. | 303/114 X |
| 4,778,225 | 10/1988 | Rudolph et al. | 303/114 |
| 4,819,996 | 4/1989 | Belart et al. | 303/114 |
| 4,828,337 | 5/1989 | Wagner et al. | 303/114 |
| 4,900,101 | 2/1990 | Becker et al. | 303/114 X |

FOREIGN PATENT DOCUMENTS

| | | |
|---|---|---|
| 1164856 | 3/1964 | Fed. Rep. of Germany . |
| 2716471 | 10/1978 | Fed. Rep. of Germany . |
| 3505410 | 8/1986 | Fed. Rep. of Germany . |
| 3641105 | 6/1988 | Fed. Rep. of Germany . |

Primary Examiner—Douglas C. Butler
Attorney, Agent, or Firm—Robert P. Seitter; J. Gordon Lewis

[57] ABSTRACT

A device for the generation of auxiliary pressure for slip-controlled brake systems with a pedal-force-operated brake booster connected to a tandem master cylinder (19). A pressure is transmittable in the brake booster housing (7) of the brake booster to the wheel brakes connected downstream. This pressure is controlled by an electromagnetically operated control valve (5) in that the pressure as a hydraulic pressure is influenced by the pneumatic actuation of a servo piston (2). The servo piston (2) is fastened on an auxiliary pressure control piston (1) within the brake booster housing (7) and the influence is a function of thermodynamic state variables of different energy sources (11). Thus, a device is provided for the generation of auxiliary pressure which, while using simple constructional configuration, provides an operationally reliable and economical use of available thermodynamic state variables such as the atmospheric pressure and of the gas throttling of an internal combustion engine.

20 Claims, 1 Drawing Sheet

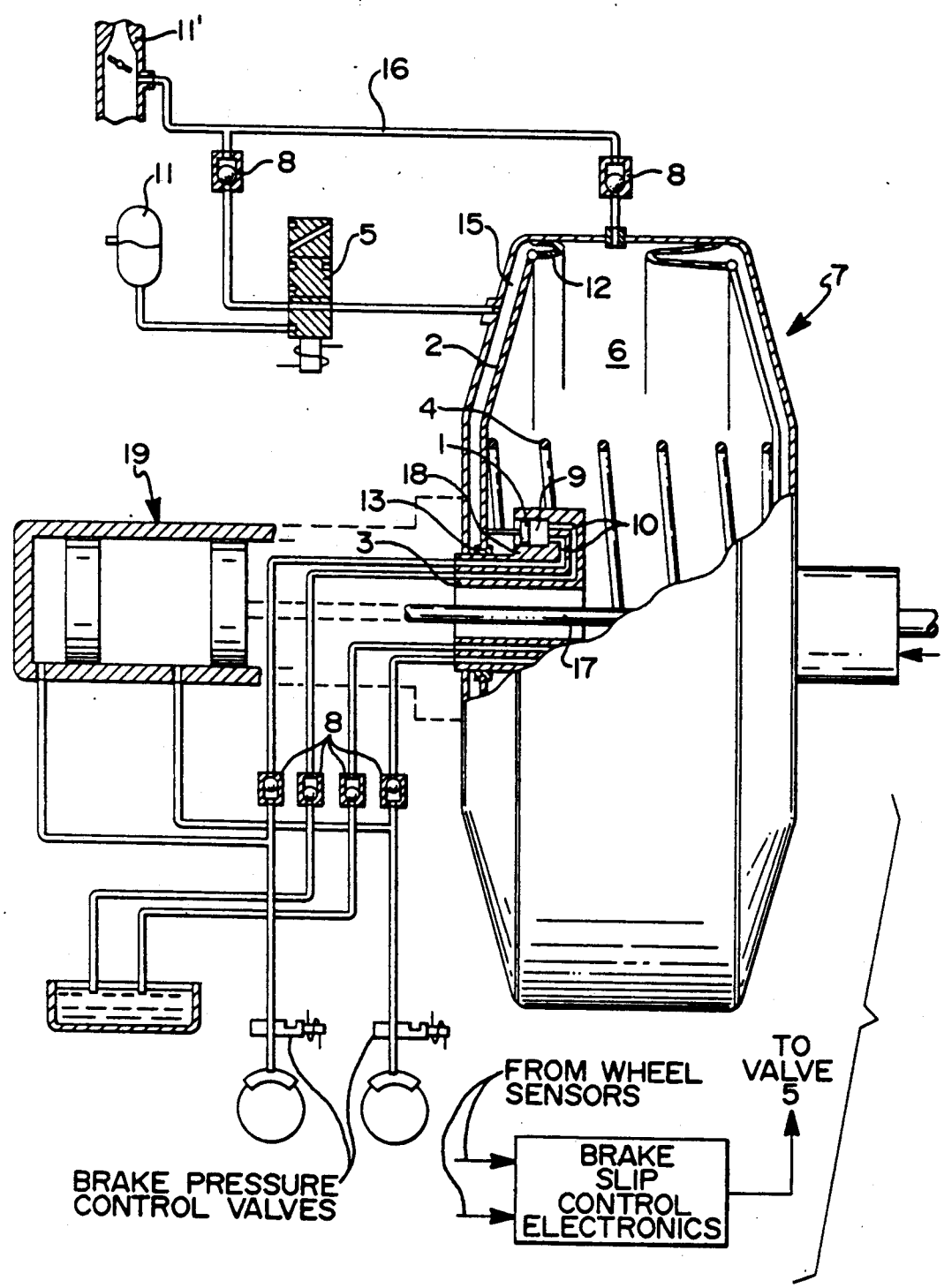

DEVICE FOR THE GENERATION OF AUXILIARY PRESSURE FOR SLIP-CONTROLLED BRAKE SYSTEMS

BACKGROUND OF THE INVENTION

This invention relates to a device for the generation of auxiliary pressure for slip-controlled brake systems with a pedal-force-operated brake booster connected to a tandem master cylinder. The hydraulic pressure is controlled as a function of thermodynamics state variables of different energy sources.

In known brake systems of this type a tandem master cylinder with a vacuum brake booster connected upstream is used as a braking pressure generator (German Published Patent Application DE-OS 35 05 410). The device for generating an auxiliary pressure consists of a hydraulic pump driven by way of an electric motor and communicating with a pressure medium storage reservoir and an auxiliary pressure control valves. At the wheel brakes directional valves connected to the braking pressure generator are inserted into the brake lines from the braking pressure generator cylinder to the wheel brakes. In their rest position, that is, in their initial position, the directional valves hydraulically connect the braking pressure generator with the wheel brakes. After a change-over into a second operating position, the valves connect the auxiliary pressure source to the brake lines and, therefore, to the wheel brakes. To this end, 2/2-way valves are arranged in tandem in each brake line. Of these valves, the first valve is pressure-operated while the second valve is electrically operated. In each case, a pressure line which is provided with a check valve connects the hydraulic pump with the brake line section. This links the two directional valves thereby to establish pressure medium communication. A return line is connected to each brake line section connecting the second directional valve with the wheel brakes. IN each case a third electrically operated two-position directional valve is arranged in the return line. As the demanded auxiliary pressure generation is ensured by the additional arrangement and the electrical activation of a specifically designed electric drive at the hydraulic pump an additional substantial constructional expenditure is needed in order to guarantee a necessary separate energy source for driving the hydraulic pump.

One of the objects of the present invention is improving a brake system with slip control of the type referred to, so that, while using a simple and cost-saving structural means and maintaining the operational reliability, a device for auxiliary pressure generation is provided. The device ensures the demanded generation of auxiliary pressure without external energy sources at a minimal constructional expenditure and with the advantageous feature of integration into the brake booster.

SUMMARY OF THE INVENTION

Briefly, a device is provided for the generation of auxiliary pressure which, while using simple constructional means, enables an operationally reliable and economical use of the available thermodynamic state variables such as the use of the atmospheric pressure in conjunction with the vacuum resulting from a throttling action of an internal combustion engine. In order to enable rigid as well as good sealing properties of the servo piston in the brake booster the present invention provides a servo piston in the direction of the pedal as a concavely arched, plate-shaped component and, for the purpose of free, but well-sealed movability, provides the servo piston at its outer edge with an annularly enclosing diaphragm connected with the brake booster housing Advantageously, the auxiliary pressure generator housing has a radial collar-shaped shoulder at an axial distance which, for the actuation of the auxiliary pressure control piston, can be guided in a freely movable manner in the axial direction on the auxiliary pressure generator housing, along with the servo piston by way of an elastic seal, in order to enable the suction stroke and delivery stroke of the pump in an unhindered manner. In order to control the auxiliary pressure, non-return valves are provided in the auxiliary pressure channels, which valves automatically define the direction of flow through the auxiliary pressure channels in order to prevent the auxiliary pressure chamber from being drained or to prevent a delivery-stroke-side return of the fluid.

BRIEF DESCRIPTION OF THE DRAWING

Further characteristics, advantages and applications of the present invention will become evident from the following detailed description of an embodiment taken in conjunction with the accompanying drawing wherein the single figure illustrates the device in accordance with the present invention.

DETAILED DESCRIPTION

FIG. 1 shows the partial section of a schematically represented vacuum brake booster of a slip-controlled brake system with the device in accordance with the present invention for auxiliary pressure generation, consisting of an auxiliary pressure control piston 1 arranged in an auxiliary pressure generator housing 3. Depending on its position, the auxiliary pressure control piston 1 actuates several auxiliary pressure channels 10 in a pressure-applying manner and, depending on the position of the auxiliary pressure control valve 5, a communication is effective between the energy sources of different pressures 11 for the actuation of the auxiliary pressure control piston 1. Accordingly, a medium enclosed in the auxiliary pressure chamber 9 confined by the auxiliary pressure control piston 1 in the auxiliary pressure generator housing 3 experiences a change in the energy state upon the activation of the auxiliary pressure control piston 1. The change of the energy state in the auxiliary pressure chamber 9 is effected by the indirect action of the energy sources 11 on a servo piston 2 arranged with the auxiliary pressure control piston 1 in an integrated manner in the brake booster housing 7.

In accordance with the embodiment described herein, the vacuum-and-pressure-applied brake booster housing 7 has a rotationally symmetrical, cup-shaped design so that the servo piston 2 actuating the auxiliary pressure control piston 1 is adapted in a plate-shaped manner to the shape of the booster housing. By way of an annular diaphragm 12, the servo piston 2 is elastically held and sealed on its outer edge in the brake booster housing 7 in the direction of actuation of the tandem master cylinder 19 connected in front of the brake booster. On the inner edge of the relatively rigid servo piston 2 a seal 13 is preferably punched out of sheet metal elastically deformable in the axial direction. The seal ensures a faultless sealing action in respect of the auxiliary pressure generator housing 3 shaped as a hollow cylinder so that the two front faces of the servo piston 2 are applicable by a differential pressure by way of the preferably electromagnetic actuation of an auxiliary pressure control valve 5 arranged as a 3/3-way valve. In addition to using the atmospheric pressure source available as energy source 11, it also is possible to use the vacuum source of a gasoline engine for generating the demanded differential pressure drop and, thus, for acting upon and for moving the servo piston 2. By way of a rigid connecting rod, the servo piston 2 actuates the auxiliary pressure control piston 1. Thus, the required auxiliary pressure generation is ensured when the auxiliary pressure control piston 1 performs an oscillating pumping movement, composed of a suction stroke and a delivery stroke, with the non-return valves 8 operating which are connected downstream and upstream and which open in the direction of flow. Under the action of its prestress, a spring 4 coaxially arranged in the brake booster housing 7 supports itself with a first spring end on the servo piston 2 and, with its second spring end, on the diaphragm-enclosed working piston 14 of the brake booster. Accordingly, when not activated, the auxiliary pressure control piston 1 performs a suction stroke upon its being displaced into its basic position, thereupon being positioned for the delivery stroke.

The following description explains the mode of operation of the device for auxiliary energy supply in accordance with the present invention in greater detail. In the illustrated operating position of the auxiliary pressure control valve 5 provided as a 3/3-way- valve the vacuum preferably tapped at the intake elbow of a petrol engine enters the servo chamber 15 illustrated in the left portion of FIG. 1. A pressure line 16 branched off upstream of the auxiliary pressure control valve 5 is permanently connected to the brake booster chamber 6 so that, due to the branch at the same pressure source, the servo piston 2 remains in the illustrated basic position under the action of the spring 4. Upon an electromagnetic actuation of the auxiliary pressure control valve 5 the valve will change over so that the servo chamber 15 is acted upon by the atmospheric pressure or by a pressure accumulator acting as energy source 11 and the brake booster chamber 6, which continues to be acted upon by the branch of the vacuum energy source 11, and exerts a differential force on the servo piston 2. By means of the auxiliary pressure control piston 1, the force effects a decrease in volume and, hence, a delivery stroke in the auxiliary pressure chambers 9 so that, ultimately, delivery of the auxiliary pressure by way of the non-return valves 8, opening in the direction of pumping, will be made possible into the wheel brakes. As a function of the switching pulses which are preferably evaluated and transmitted by way of a control device electronics and supplied to the auxiliary pressure control valve 5, a defined auxiliary pressure supply characteristic is achieved at the wheel brakes as a function of the criteria of time and time phase. When the auxiliary pressure control valve 5 is in its mid-position, the 3/3way valve will lock both the atmospheric port and the vacuum port towards the auxiliary pressure control chamber 15 so that there will be no pumping movement of the auxiliary pressure control piston 1. Parallel to the axis of symmetry of the brake booster, the auxiliary pressure generator housing is analogously provided with a second auxiliary pressure control piston and the appertaining auxiliary pressure channels for the purpose of compensating the tilting force at the servo piston 2. The mode of operation of this piston and the channels corresponds to previously described auxiliary pressure device. By arranging a second auxiliary pressure control piston, associated at a distance symmetrically and parallel to the first auxiliary pressure control piston, it is possible to considerably increase the operational reliability while simultaneously enhancing the pumping capacity.

What is claimed is:

1. A device for the generation of auxiliary pressure for slip-controlled brake systems with a pedal-force-operated brake booster having a housing and being connected to a tandem master cylinder transmitting a hydraulic pressure to wheel brakes connected downstream, said hydraulic pressure being controlled by electromagnetically operated control valves, an auxiliary pressure control valve (5) connecting different energy sources (11, 11') to a servo piston (2) in said housing wherein the hydraulic pressure is controlled by pneumatic actuation of said servo piston (2), fastened on an auxiliary pressure control piston (1) within the brake booster housing (7), as a function of thermodynamic state variables of said different energy sources (11, 11').

2. A device for the generation of auxiliary pressure as claimed in claim 1, wherein the inner edge of the servo piston (2) in the brake booster housing (7) is limited by a seal (13) arranged on an auxiliary pressure generator housing (3).

3. A device for the generation of auxiliary pressure as claimed in claim 1, wherein on its outer edge, the servo piston (2) cooperates with a diaphragm (12) fastened in the brake booster housing (7).

4. A device for the generation of auxiliary pressure as claimed in claim 3, wherein the auxiliary pressure generator housing (3) is rigidly fixed in a coaxial position in the brake booster housing (7).

5. A device for the generation of auxiliary pressure as claimed in claim 4, wherein the auxiliary pressure generator housing (3) is open in the configuration of a hollow cylinder and is centrosymmetrically penetrated by a push-rod (17).

6. A device for the generation of auxiliary pressure as claimed in claim 5, wherein at an axial distance, the auxiliary pressure generator housing (3) has a radial collar-shaped shoulder (18) of enlarged diameter.

7. A device for the generation of auxiliary pressure as claimed in claim 6, wherein at least one bore is provided in the collar-shaped shoulder (18) in order to receive an auxiliary pressure chamber (9).

8. A device for the generation of auxiliary pressure as claimed in claim 7, wherein the auxiliary pressure chamber (9) has a variable volume which is locked by the auxiliary pressure control piston (1) and which is formed by a suction stroke and a delivery stroke.

9. A device for the generation of auxiliary pressure as claimed in claim 8, wherein the suction and delivery strokes of the auxiliary pressure control piston (1) are synchronized to the sequence of motions to the oscillating motion of the servo piston (2).

10. A device for the generation of auxiliary pressure as claimed in claim 9, wherein motion of the auxiliary pressure control piston (1) adapted to the servo piston (2) takes place synchronously by way of a rigid connecting element.

11. A device for the generation of auxiliary pressure as claimed in claim 10, wherein auxiliary pressure channels (10) are arranged on the front face of the auxiliary pressure chamber (9) opposite the auxiliary pressure control piston (1).

12. A device for the generation of auxiliary pressure as claimed in claim 11, wherein at least one auxiliary pressure channel (10) connects a storage reservoir (11) of said different energy sources (11, 11') with the auxiliary pressure chamber (9) by way of a non-return valve (8) opening in the direction of flow.

13. A device for the generation of auxiliary pressure as claimed in claim 11, wherein at least one auxiliary pressure channel (10) connects the wheel brakes with the auxiliary pressure chamber (9) by way of a non-return valve (8) opening in the direction of flow.

14. A device for the generation of auxiliary pressure as claimed in claim 13, wherein the servo piston (2) has the approximate shape of a plate concavely arched towards the pedal side, with the servo piston (2) on its inner edge being penetrated by a coaxial bore serving to receive the auxiliary pressure generator housing (3).

15. A device for the generation of auxiliary pressure as claimed in claim 1, wherein at a radial distance in respect of the inner edge of the servo piston (2), a spring (4) is rested, supported with a first spring end on the hollow-arched front face of the servo piston (2).

16. A device for the generation of auxiliary pressure as claimed in claim 15, wherein the pneumatic actuation of the servo piston (2) is effected by way of said auxiliary pressure control valve (5) provided as a 3/3-way valve.

17. A device for the generation of auxiliary pressure as claimed in claim 16, wherein the actuation of the auxiliary pressure control valve (5) is effected electromagnetically.

18. A device for the generation of auxiliary pressure as claimed in claim 17, wherein the actuation of the auxiliary pressure control valve (5) is realizable by way of means responsive to the pumping stroke of the auxiliary pressure control piston (1).

19. A device for the generation of auxiliary pressure as claimed in claim 17, wherein the actuation of the auxiliary pressure control valve (5) is effected by way of control device signals of brake slip control electronics as a function of the demanded pressure supply characteristic in accordance with the criteria of time and time phase.

20. A device for the generation of auxiliary pressure as claimed in claim 16, wherein a communication between said energy sources (11, 11') of different pressures is established through the auxiliary pressure control valve (5), between the vacuum in the intake elbow of a petrol engine and the atmospheric pressure.

* * * * *